United States Patent [19]

Anderson et al.

[11] 4,220,318
[45] Sep. 2, 1980

[54] IN-LINE MATERIAL HANDLING SYSTEM

[76] Inventors: Harry E. Anderson, 307 Foxcroft Rd., Pittsburgh, Pa. 15220; Raymond E. Heasley, 38 Silver La., McKees Rocks, Pa. 15136

[21] Appl. No.: 917,102

[22] Filed: Jun. 19, 1978

[51] Int. Cl.² .............................................. B23K 7/08
[52] U.S. Cl. ...................................... 266/49; 83/155; 83/156; 198/342; 198/343
[58] Field of Search .................. 198/342, 343; 83/155, 83/155.1, 156; 266/49

[56] References Cited

U.S. PATENT DOCUMENTS

| | | | |
|---|---|---|---|
| 3,393,590 | 7/1968 | Boyd | 83/156 |
| 3,687,433 | 8/1972 | Bode | 266/50 |
| 3,736,822 | 6/1973 | McVaugh | 83/155.1 |
| 3,743,260 | 7/1973 | Alleman et al. | 266/50 |
| 3,965,783 | 6/1976 | Müller et al. | 83/155.1 |
| 4,047,706 | 9/1977 | Tronvold | 266/49 |
| 4,116,097 | 9/1978 | Graham et al. | 83/155 |
| 4,162,060 | 7/1979 | Anderson | 266/49 |

Primary Examiner—L. Dewayne Rutledge
Assistant Examiner—John P. Sheehan
Attorney, Agent, or Firm—Webb, Burden, Robinson & Webb

[57] ABSTRACT

An in-line material handling system for transporting work from one processing station to another, particularly to a station where the work is processed by burning, includes a pair of conveyor means aligned end-to-end. The first conveyor means comprises a loading conveyor for moving the work to the burning station and the second conveyor means comprises a supporting and off-loading conveyor for supporting the work during burning and for discharging it from the burning station. The second or supporting conveyor means may be integrally incorporated in a water table at the burning station to collect dross and swarf from the burning operation.

17 Claims, 7 Drawing Figures

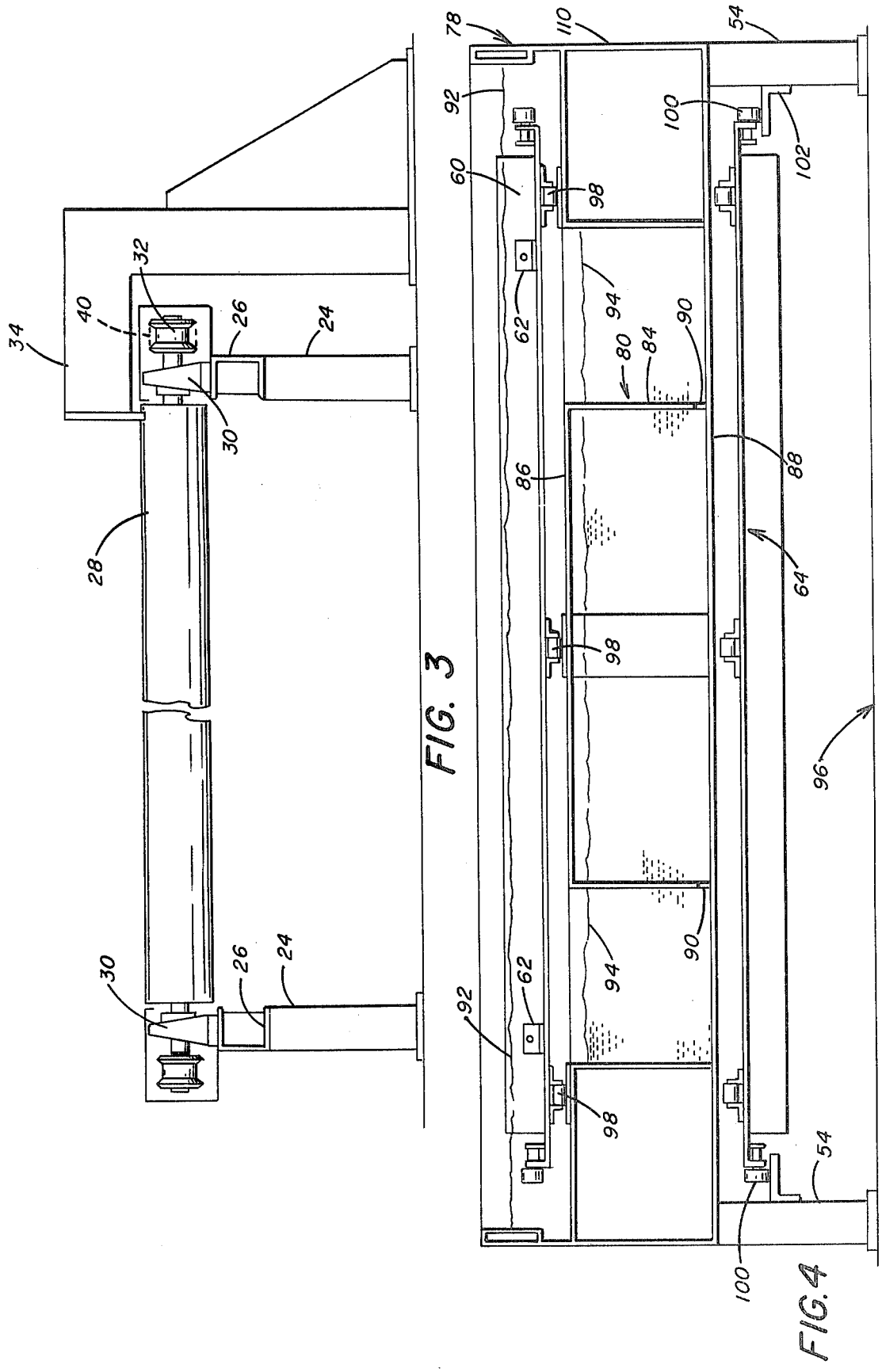

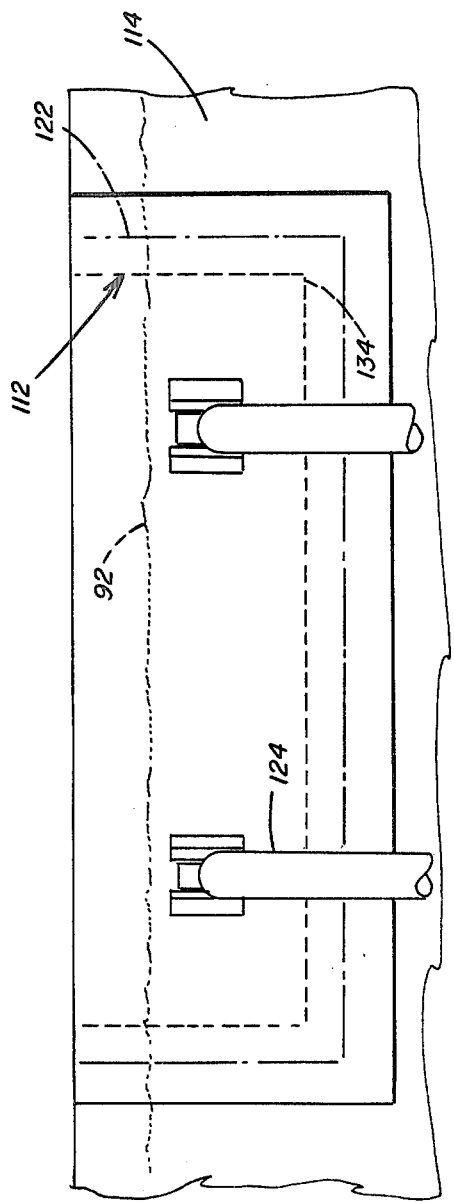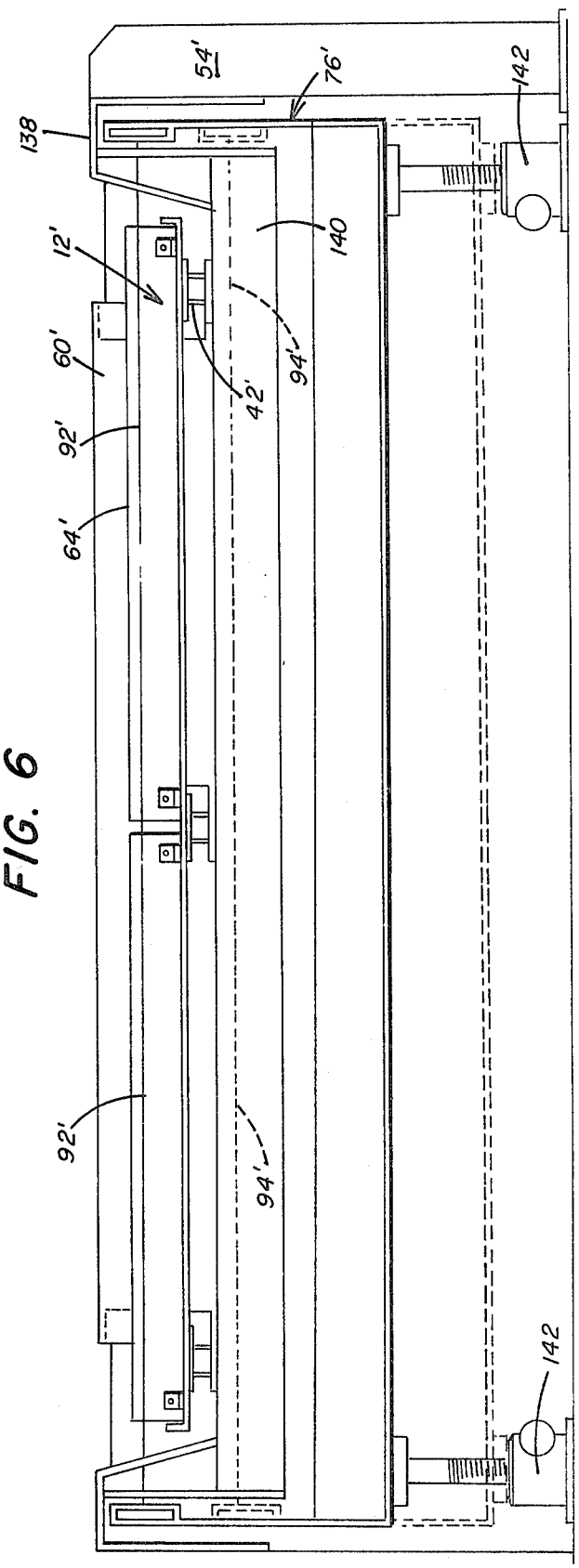

IN-LINE MATERIAL HANDLING SYSTEM

FIELD OF THE INVENTION

This application relates to a material handling system and particularly to an in-line system for transporting work from one processing station to another, especially to a work station where the work is processed by burning. The system incorporates means for cutting the work over water to reduce substantially air pollution generated in the processing.

BACKGROUND OF THE INVENTION

Burning processes previously used to cut work, for example metal plate, have generated considerable pollution during cutting. Recently water tables have been developed which, when located under the burning machines, substantially reduce the concentration of pollutants by trapping swarf and dross in water which is then drained. Some of these water tables employ what is called the "air-over-water" principle whereby air is used to change the level of the water in the table so that it can be raised to a point near the work to be processed and, subsequent to processing, the water level can be lowered to permit access to the burning area. In view of the emphasis now placed on environmental protection, the use of equipment such as water tables in connection with cutting apparatus is widespread.

In any material handling system it is desirable to have a continuous, substantially uninterrupted flow of material from one processing station to another to maintain high utilization of expensive machines such as burning machines. It is also desirable to have only as much burning apparatus as necessary in view of the high capital costs of such apparatus and the premium placed on available plant floor space. However, it must be recognized that the object of any material handling system is to efficiently move the work so that the maximum number of workpieces are processed in minimum time.

Although aligned conveyors have been used in cutting operations before, none has incorporated one or more of such conveyor means in an in-line system with a water table.

SUMMARY OF THE INVENTION

Briefly, the present invention is an in-line material handling system for transporting work from one processing station, e.g. an onloading station, to another, e.g. a burning and/or off-loading station. In particular, the system comprises transporting means in the form of conveyor means aligned end-to-end. The first or on-loading conveyor means is for moving the work to a processing station, for example a burning station, where the work is cut into predetermined shapes by torches which are automatically and precisely controlled, usually by computer program. The burning station comprises a burning machine or apparatus, for example of the conventional "bridge" type construction which extends over and intermediate the ends of a second conveyor means for supporting the work during the burning operation and for off-loading the work from the system. The second conveyor means may be integrally incorporated in a pollution control device in the form of a water table including a water-holding tank which is positioned under the burning apparatus. A preferred form of water table employed in the system includes means for raising and lowering the level of the water in the tank. In another form of water table, the water-holding tank is raised and lowered with respect to its supporting means and the burning apparatus. Appropriate and novel means are provided for passing the second conveyor means through the water-holding tank and for sealing the ends of the tank such that the water level in the tank can be raised above the plane of the second conveyor means to a height near the underside of the work being processed or, if desired, to a predetermined high level which may include total submersion of the work.

Features of the present system include the construction of the second conveyor means which employs endless chain carrying lateral burning bars for supporting the work during cutting and having special or transition links suitably spaced along the length of the chain for accommodating means for sealing the ends of the water-holding tank. In addition, the chain is provided with a plurality of unique guards or collector elements which prevent swarf or dross from entering the spaces in the chain links and fouling the operation of the conveyor means. By utilizing the second conveyor means for supporting the work during cutting and for off-loading work, jamming of the conveyor by swarf or dross falling into the chain is avoided. Furthermore, by using the second conveyor means for off-loading of the processed work, swarf or dross on the conveyor can be carried away from the burning station to the end of the conveyor and discharged directly into disposal means such as a waste container, a floor channel, or other disposal means or area from which it is mechanically removed.

The in-line material handling system according to the invention enables the off-loading area to remain essentially free of water for the convenience and safety of operating personnel. The on-line concept permits utilization of the expensive burning apparatus up to about 85–90% of capacity thus maintaining very high production of cut work.

A complete understanding of the present invention will be obtained from the present description when taken with the accompanying drawings.

BRIEF DESCRIPTION OF THE DRAWINGS

In the Figures:

FIG. 3 is an enlarged cross-sectional view taken along lines III-III of FIG. 1;

FIG. 4 is an enlarged cross-sectional view taken along lines IV-IV of FIG. 1;

FIG. 6 is a partial end view of the water-holding tank taken along lines VI-VI of FIG. 1; and FIG. 7 is a view of another embodiment of the invention similar to the view shown in FIG. 3 showing an alternate embodiment of the water table.

BRIEF DESCRIPTION OF PREFERRED EMBODIMENTS OF THE INVENTION

Figure 1:
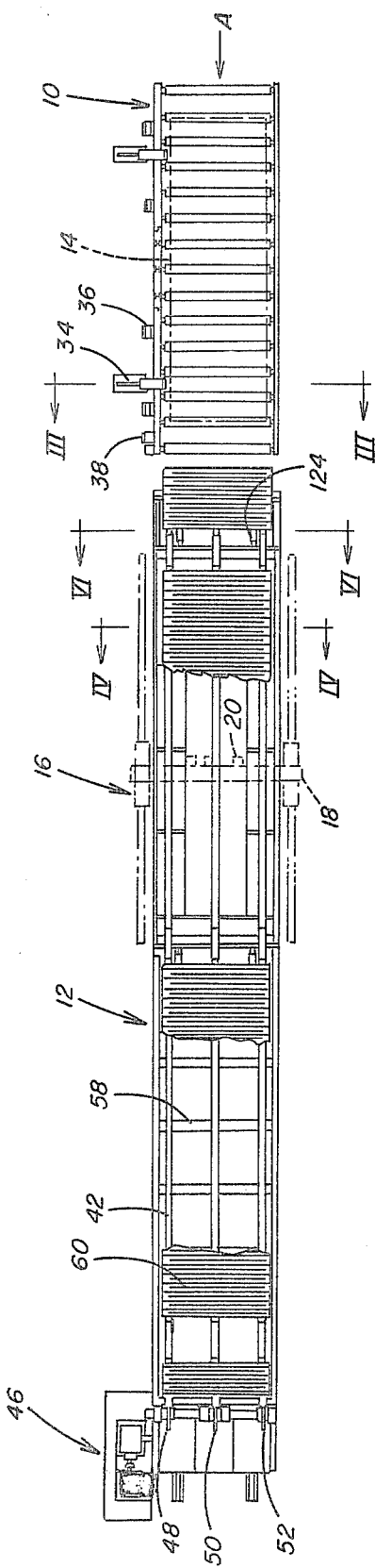
FIG. 1 is a plan view of the preferred in-line material handling system in accordance with the invention.

Referring to FIGS. 1 through 6 the preferred in-line plate handling system according to the invention includes a first on-loading conveyor means 10 and a second plate supporting or off-loading conveyor means 12.

The conveyor means are aligned with each other to permit work, such as a plate 14 (shown in dashed lines), to be loaded onto the first conveyor means 10, transported in the direction of arrow A to and onto an end of the second conveyor means 12 beneath a conventional burning apparatus 16 including moveable bridge beam 18 carrying torches 20. After burning is complete, the burned plate is moved in the direction of arrow A to the opposite or downstream end of the second conveyor means where it is off-loaded from the conveyor means, for example by an overhead crane or similar device. Swarf or dross generated during the burning operation is also carried in the direction of arrow A with the burned plate to a scrap unloading station where it is emptied into a waste container 22 positioned adjacent the downstream end of the second conveyor means.

The first conveyor means 10 is preferably a heavy duty roller conveyor mounted on a structure comprising vertical members 24 supporting longitudinal side beams 26, as more particularly shown in FIG. 3. Lateral rollers 28 are journalled in boxes 30, and driven through spools or sprockets 32. The first conveyor means may be suitably loaded with work, such as plate 14, by an overhead crane or similar apparatus. The plates may be vertically or horizontally loaded. After loading, the plate is properly aligned or "squared" with the centerline of the longitudinal conveyor means 10, 12 to insure that it can advance with the conveyor means without jamming. While the initial alignment is done by the operator of the crane or similar mechanism using as guides conventional heavy stationary or fixed stops 34 to assist alignment, the final alignment is insured by the use of pneumatic devices 36 integrally mounted on the conveyor means 10. Means are provided for driving the conveyor 10 in the form, preferably, of an electric gear-motor 38 which is connected through continuous roller chains 40 to each roller 28.

Figure 5:
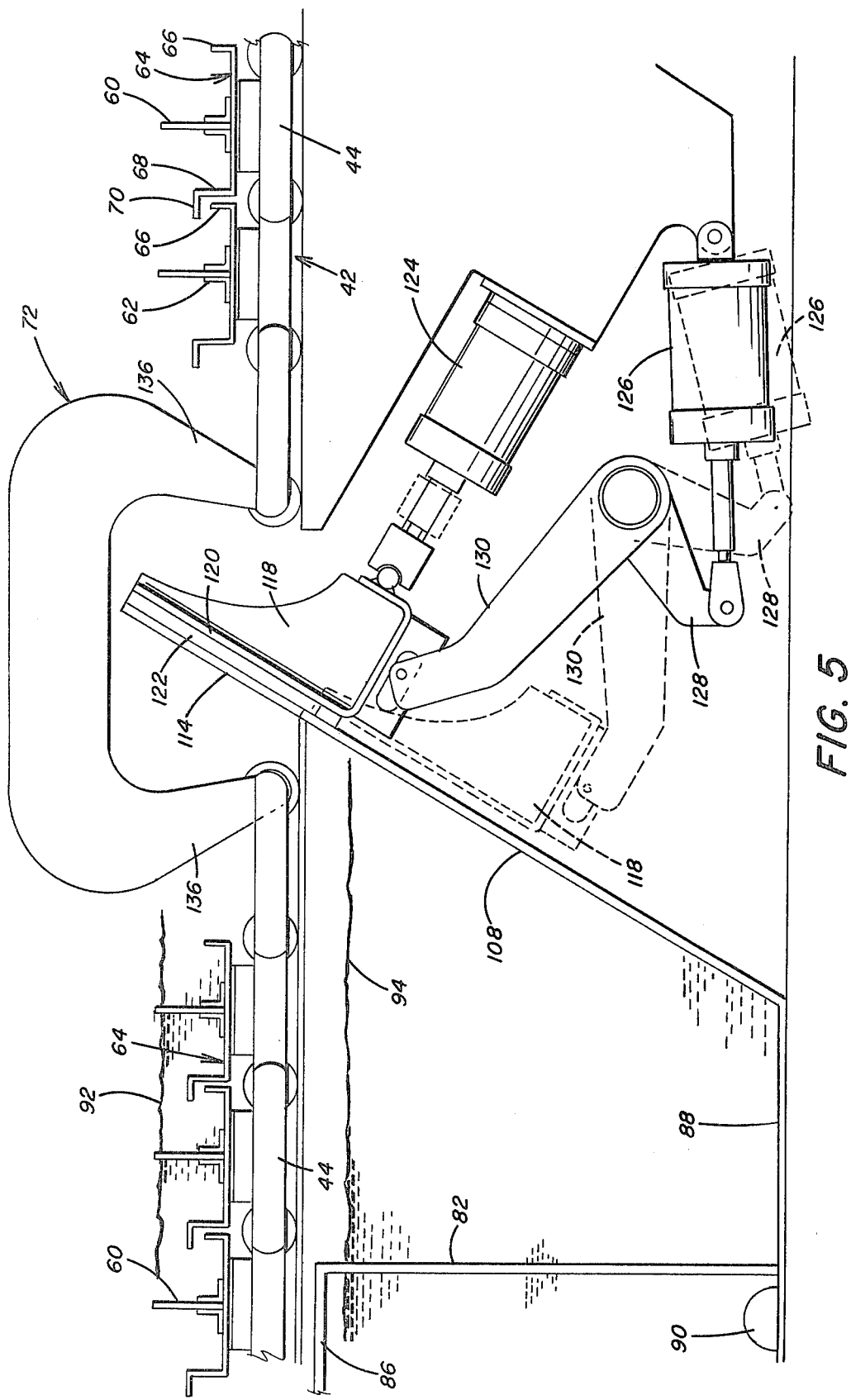
FIG. 5 is an enlarged side elevational view of the upstream end of the second conveyor means.

The second conveyor means 12 comprises a plurality of continuous chains 42 formed by links 44 driven by driving means, preferably, in the form of an electric gear-motor 46 over sprockets 48, 50, 52 mounted at opposite ends of the conveyor means on a structure comprising vertical members 54 which carry longitudinal beams 56 and lateral beams 58. As shown in FIG. 5, work support elements or burning bars 60 are laterally mounted to each or alternate links 44 of each chain 42. Each burning bar preferably is secured, as by welding or by brackets 62, to a guard element 64 mounted on links 44 of the chains. The guard elements are in the form of a channel member having a pair of upstanding legs 66, 68 and a forwardly extending leg 70 which overhangs leg 66 of the preceding guard element. Thus the guard elements are so designed as to collect slag produced during the burning operations and, when the conveyor advances to the downstream end of the system, dumps the slag in the form of swarf, dross or small scrap into waste container 22 or similar disposal or collection means. There are at least two chains per conveyor, one on each side, and, preferably, as shown in the figures, three chains 42 are employed.

The second conveyor means 12 serves as both a supporting conveyor for the plate 14 during the burning operation and as an off-loading conveyor, thereby eliminating any gap which would otherwise be present. Such a gap is undesirable since small parts and scrap could fall into the chains, thereby tending to create problems of jamming the conveyor regardless of the presence of the slag collecting or guard elements 64.

Each conveyor chain 42 of the second conveyor means is provided with at least two and preferably with a plurality of inverted U-shaped links 72 hereinafter called "transition links" which are spaced along the chains at appropriate distances to accommodate sealing means 74 at both ends of a water table 76 which is positioned adjacent the upstream end of conveyor means 12 and below the burning apparatus 16. The transition links are designed to resist the total tension load on the chains 42 and to straddle or bridge a portion of the sealing means 74 as will be described in further detail hereinafter.

The water table 76 comprises, essentially, a water-holding tank 78 having an internal chamber 80 which, as shown, includes end walls 82, side walls 84, top wall 86 and a common bottom wall 88 with the tank 78. Gas, e.g. air, may be introduced or discharged above water in the chamber 80, which is in fluid communication with the balance of the tank through perforations 90 in the side walls of the chamber 80 to raise and lower the water level in the tank between an upper level 92 and lower level 94. As shown in FIG. 5, the upper level is above the conveyor chains 42 but slightly below the tops of the burning bars 60. The lower water level is below the conveyor chain, such that when the conveyor means 12 is advanced it does not move in water. The means and method of raising and lowering the water level utilizes the well known "air-over-water" principle and need not be described further, except in connection with the operation of the in-line system.

A particular feature of the invention is the means for permitting movement of the second conveyor means 12 through the water table 76 beneath the burning machine 16 at the burning station. Of course, sufficient clearance must be provided below the tank 78 and above a plant floor 96 (see FIG. 2) to allow for return of the chain.

The conveyor means 12, as shown in FIG. 4, is mounted at each side and in the center on rollers 98 so that the upper or advancing flights are maintained in a plane under the burning apparatus. The lower or return flights of the conveyor means are mounted on outboard rollers 100 which run along L-shaped flanges 102 welded to the vertical support members 54.

Figure 2:
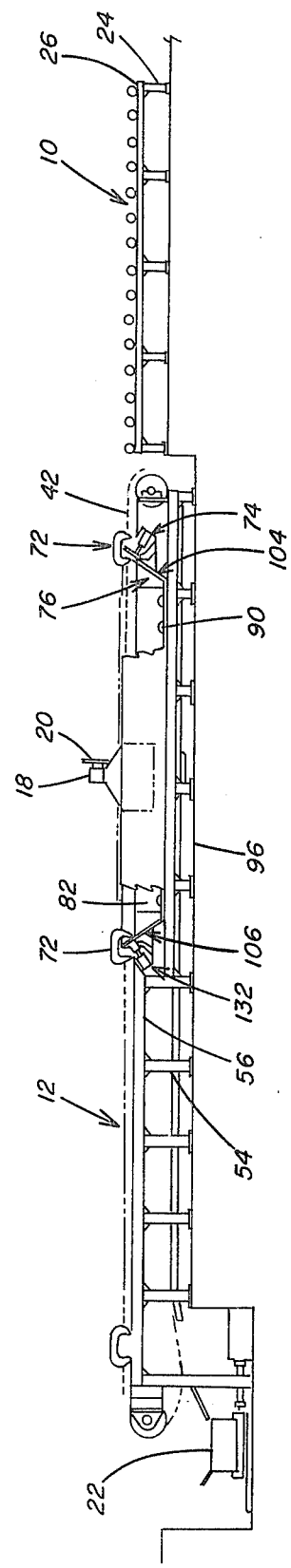
FIG. 2 is a side elevation view of the system shown in FIG. 1, having a portion cut-away to show details of the water table.

As shown in FIG. 2 the opposite ends of the water-holding tank 78 hereinafter referred to as entry end 104 and exit end 106 are similarly designed, but of reverse hand. Hence, only one end, in this case the entry end, need be described in detail. Referring specifically to FIGS. 4, 5 and 6, the entry end 104 of the tank includes a sloped end wall 108, although a vertical wall can be used, which is welded along its vertical edges and bottom edge to the side walls 110 and bottom wall 88 of the tank. An opening 112 of substantially rectangular configuration (although it may be of any shape sufficient to permit the conveyor means to pass) is provided adjacent the top of the end wall 108 of the tank of sufficient width to accommodate the width of the conveyor means 12. The width of the opening, however, is less than the total width of the tank to provide wall portions 114 between the edges of the tank and the vertical edges of the opening 112 against which a seal carried by sealing means 74 may be positioned to close the opening 112 against liquid, i.e. water.

The sealing means 74 must be one which is moveable to open and close the opening 112. A preferable sealing means, shown in the drawings and especially FIGS. 5 and 6, comprises a bracket 118 including a substantially rectangular planar member 120 having a width greater than the width of the opening 112 and a height greater than the height of opening 112. A sealing or gasket material 122, for example a closed cellular rubber, is affixed to the face of the member 120 such that, when the sealing means 74 is positioned as shown in solid lines in FIG. 5, the gasket material 122 is forced under pressure provided by double acting cylinder 124 (of which there are preferably two or more spaced across the width of the tank) against the wall portions 114 and the other portions of the entry end wall 108 engaged by the sealing material to close the end of the tank against liquid flow. The sealing means is disengaged by actuation of another double acting cylinder or cylinders 126 located near the bottom of the tank. When the cylinder rod of cylinder 126 is withdrawn it pulls upon member 128, camming arm 130 attached to bracket 118, causing the sealing means to move into the position indicated in dotted lines in FIG. 5. As previously stated, a similar sealing mechanism 132 is provided at the exit end of the tank 72 where the end wall has a substantially similar opening as opening 112 for accommodating the chain conveyor means 12. With the provision of such sealing means at opposite ends of the tank, therefore, it is possible to raise the water level in the tank above the lower edges 134 of the openings through which the conveyor means extends when the sealing means are engaged and to lower the water level below the openings so that the sealing means can be disengaged. When the sealing means are disengaged, the conveyor means can be advanced to move plate thereon from one processing station to another. When the sealing means are engaged against the ends of the tank 78, the water level can be raised above the conveyor chains and the plate supported on the burning bars, the tops of which may extend slightly above the water level, such that smoke, dross and swarf from the burning operation can be quenched during the burning operation and increase the thermal stability imparted to the plate during cutting. Increased thermal stability of the plate, it has been found, enhances dimensional accuracy of the cutting being done on the plate.

To permit engagement and disengagement of the sealing means against the entry and exit ends of the water table 76 the unique transition links 72 have been provided. Each transition link 72 is basically an inverted U-shaped link structure, the legs 136 of the U being joined to the conventional chain links 44 in a known manner, as by bolts, rivets or similar fastening devices. The overall proportions of the link are important as it is essential that the internal opening provided between the legs of the U-shape be such as to permit the sealing means to pass into and out of the shape without interference to permit the sealing means to be engaged and disengaged from the entry and exit ends of the tank and the distance between the connections of the legs with the chain links must be less than one fourth of the circumference of the sprockets 48, 50, 52. The transition links may be made of any acceptable material, preferably steel. The transition links, as shown, are spaced in sets depending upon the number of chains along each of the chains in such a manner that when the conveyor is stopped in position for cutting, one set of transition links is positioned over the sealing means at one or the exit end of the tank and another set of transition links is positioned over the sealing means at the opposite or entry end of the tank. While the transition links are preferably equally spaced around the chain conveyor, it is not essential that this be done since it is only necessary that two transition links be so spaced.

In FIG. 7 is illustrated a partial end view of an alternate embodiment of the supporting structure, water table 76' and conveyor means 12'. As shown, the supporting structure includes vertical member 54' having a flange 138 from which is suspended a transverse member 140 on which the conveyor chains 42' ride. As in the preferred embodiment previously described the chains carry burning bars 60' and slag collection or guard elements 64'. However, in this embodiment, instead of the water level in the water table 76' being changed by use of the introduction and discharge of gas, i.e. air, the entire water-holding tank 78' with its constant water level is raised and lowered by means such as hydraulic jacks 142 positioned at each of the four corners of the tank. Otherwise, the system is substantially as previously described.

The preferred mode of system control is electric, operator control being exercised using a control console located in an area near the burning station for visual observation of the burning operation. The operation may be partially or wholly computer controlled after a plate or the work is properly positioned and oriented on the first conveyor means and the unloading of completed parts is accomplished at the off-loading station. Electrical interlocks, of a known design, are utilized to insure proper functioning of the equipment, avoid damage and assure personnel safety. Among the interlocks provided are ones assuring proper plate orientation on the on-load conveyor, proper water level in the water table holding tank, proper position of sealing means—either in engagement with the end walls of the holding tank or separated therefrom—and accessibility of the onloading conveyor means for new work.

All functions of the system can be controlled individually and electrically when the system is in the manual mode although electrical interlocks are provided to insure safety.

While it is contemplated that a moveable waste container such as one mounted on wheels so that it can be used and moved out for dumping is economically useful for removing slag, swarf and dross produced during the burning process, other forms of waste removal apparatus are clearly within the scope of the invention. These may include floor channels with automatic waste conveying means and the like.

OPERATION OF THE INVENTION

In the processing of flat work, such as metal plate, the operation of the in-line material handling system is highly efficient. Plate to be processed is first loaded onto the first conveyor means by an overhead crane or the like, and properly positioned for subsequent transport to the burning station. Prior to transport, the burning torches are in their uppermost position, the water level in the water table is dropped to a predetermined low position and with the transition links in proper position to straddle or bridge the water table end sealing means, the water table sealing means are retracted.

By remote control, the operator engages the conveyor drive means for conveyor means 10 causing the plate to advance on the on-loading conveyor. When the plate reaches a predetermined position relative to the entry end of the water table and second conveyor means transition links, a limit switch is tripped causing the second or plate supporting conveyor to advance at a speed which is synchronized with the on-loading conveyor to carry the plate into position beneath the burning machine. When the plate leaves the on-loading conveyor means, the conveyor means stops. The plate supporting conveyor means continues to advance until the transition links approach the exit end of the water table and reach the proper predetermined position whereat each link will straddle the upstream sealing means. At this point, the speed of the conveyor means is automatically reduced preferably to approximately ⅓ of its original speed by a limit switch controlling the two speed conveyor motor in anticipation of the predetermined stop position. At the predetermined stop position, the transition links and the sealing means must accurately and properly interface with the sealing means fitting within the transition links to engage and seal against the ends of the water table.

The water table sealing means are then engaged and the seals seated against the ends of the water-holding tank of the table. By introducing air over the water in the tank the level of the water is raised to a predetermined high level above the top of the conveyor chain to a height appropriate to the metals being burned. This may include total submersion of the plate. The same result can be obtained in the alternate embodiment of FIG. 7 by jacking the table into its higher position.

Burning of the plate then proceeds in a conventional manner.

While burning proceeds new work is positioned on the first conveyor means. Upon completion of burning, the water level in the tank (or the tank in the case of the FIG. 7 embodiment) is lowered to the predetermined low position below the conveyor chain links and the sealing means are retracted. The conveyors are then advanced automatically, carrying the burned work to the off-loading station and new work into the burn area. Swarf and dross generated during the burning are carried off the second conveyor means into a waste container or drain for removal and the cut parts and larger scrap are off-loaded by magnet, vacuum or manually.

The operation, as is evident from the foregoing description, is substantially continuous, the only interruption occurring during changing of the water table water level and retraction and engagement of the sealing means.

Through-put of work utilizing this system is on the order of 85-90% of capacity without external handling from the time of proper positioning of the un-cut plate on the on-loading conveyor to removal of the semi-finished plate from the off-loading conveyor means.

If desired, it is possible to incorporate in the operation conventional roller conveyor tables to handle very heavy gauge sheet, for example such tables may be located on either side of the water table and conventional handling equipment for semi-finished work material after burning, for example equipment for stacking the plates, for unloading them and cars for transporting the plates or similar equipment may be advantageously employed in connection with the system.

Having described presently preferred embodiments of the invention, it is to be understood that it may be otherwise embodied within the scope of the appended claims.

We claim:

1. An in-line material handling system for transporting work from one station to another station comprising:
   A. first and second conveyor means aligned end-to-end:
   (1) the first conveyor means comprising a loading conveyor for moving the work in the direction of a processing station; and
   (2) the second conveyor means comprising a supporting and off-loading conveyor for supporting the work during processing and discharging it from the processing station; and
   B. a water table at said processing station, said water table comprising:
   (1) a tank for holding water including upstanding side and end walls and having openings in the top of opposed end walls for permitting said second conveyor means to pass through said tank;
   (2) means for sealing said openings;
   (3) means for changing the water level with respect to said second conveyor means; and
   (4) means on said second conveyor means for bridging said sealing means whereby when the water level in said tank is below said openings the conveyor means can be advanced through said water table.

2. An in-line material handling system as set forth in claim 1 and including collection means at the end of the second conveyor means opposite the end adjacent the first conveyor means for collecting waste produced during processing of said work.

3. An in-line material handling system as set forth in claim 1 wherein said second conveyor comprises at least two endless chains and the means for bridging the sealing means comprise U-shaped transition links spaced along said chains a distance corresponding to the distance between the openings in the opposed side walls of the tank, the space between the legs of each of the transition links being sufficient to accommodate the sealing means.

4. An in-line material handling system as set forth in claim 3 and including a plurality of channel elements extending transversely of said chains and secured to the links thereof for preventing waste material from passing into the space between said chains and a plurality of bars secured to said elements along the length of said chain and having a height greater than the height of said elements for supporting said work during processing.

5. An in-line material handling system as set forth in claim 1 wherein said sealing means comprise:
   A. A rigid planar member having a flexible sealing material on a face thereof adapted to seal against the openings in the opposed tank walls; and
   B. means for moving the rigid planar member from a first position whereat the planar member is in contact with said walls to prevent escape of water through said openings and a second position whereat the planar member is out of contact with said openings to permit the second conveyor to pass through said openings.

6. An in-line material handling system as set forth in claim 1 wherein the means for changing the water level in the tank comprises a chamber in the tank, and means for introducing gas into the chamber and for discharging gas from the chamber above the water level in the tank.

7. An in-line material handling system as set forth in claim 1 wherein the means for changing the water level comprises means for adjustably mounting the tank such that the tank can be raised and lowered with respect to said second conveyor means.

8. An in-line material handling system as set forth in claim 7 wherein said adjustable mounting means comprises a plurality of jacks positioned below the bottom of the tank.

9. In a chain conveyor adapted to travel through an opening in a tank for holding water, a link in the chain for bridging the opening in the end wall of the tank such that the opening can be sealed when the water level in the tank is raised above the opening, the link comprising a U-shaped member having its legs connected into the chain, the space between the legs being sufficient to accommodate means for sealing the opening in the tank when the link is in position bridging the end wall of the tank.

10. An in-line material handling system for transporting work to and from a processing station comprising:
   A. means for delivering work to a conveyor means;
   B. conveyor means for supporting said work;
   C. a water table positioned at said processing station, said water table including a tank having upstanding side and end walls and having openings in opposed end walls for permitting said conveyor means to pass through the tank;
   D. means for sealing said openings; and
   E. means for changing the water level with respect to said conveyor means whereby when the water level is below said opening the conveyor means can be advanced through the water table.

11. An in-line material handling system as set forth in claim 10 wherein collection means are provided at an end of said conveyor means for collecting waste produced during processing of said work.

12. An in-line material handling system as set forth in claim 10 wherein said conveyor means comprises at least two endless chains and including a plurality of channel elements extending transversely of said chains and secured to the links thereof for preventing waste material from passing into the space between the chains and a plurality of bars secured to said elements along the length of said chain and having a height greater than the height of said elements for supporting said work during processing.

13. An in-line material handling system as set forth in claim 12 wherein collection means are provided at an end of said conveyor means for collecting waste produced during processing of said work.

14. An in-line material handling system as set forth in claim 10 wherein said sealing means comprise:
   A. a rigid planar member having a flexible sealing material on a face thereof adapted to seal against the openings in the opposed tank walls; and
   B. means for moving the rigid planar member from a first position whereat the planar member is in contact with said walls to prevent escape of water through said openings and a second position whereat the planar member is out of contact with said openings to permit the conveyor means to pass through said openings.

15. An in-line material handling system as set forth in claim 10 wherein the means for changing the water level in the tank comprises a chamber in the tank, and means for introducing gas into the chamber and for discharging gas from the chamber above the water level in the tank.

16. An in-line material handling system as set forth in claim 10 wherein the means for changing the water level comprises means for adjustably mounting the tank such that the tank can be raised and lowered with respect to said conveyor means.

17. An in-line material handling system as set forth in claim 16 wherein said adjustable mounting means comprises a plurality of jacks positioned below the bottom of the tank.

* * * * *